(No Model.)

J. C. STURGEON.
PIPE OR HOSE COUPLING.

No. 380,363. Patented Apr. 3, 1888.

Witnesses.
W. W. Simpson
J. R. Donzestki

Inventor.
J. C. Sturgeon

UNITED STATES PATENT OFFICE.

JOHN C. STURGEON, OF ERIE, PENNSYLVANIA.

PIPE OR HOSE COUPLING.

SPECIFICATION forming part of Letters Patent No. 380,363, dated April 3, 1888.

Application filed May 16, 1887. Serial No. 238,411. (No model.)

*To all whom it may concern:*

Be it known that I, JOHN C. STURGEON, a citizen of the United States, residing at Erie, in the county of Erie and State of Pennsylvania, have invented certain new and useful Improvements in Pipe or Hose Couplings; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in pipe or hose couplings, hereinafter set forth and explained in the specification and claims, and illustrated in the accompanying drawings, in which—

Figure 1:
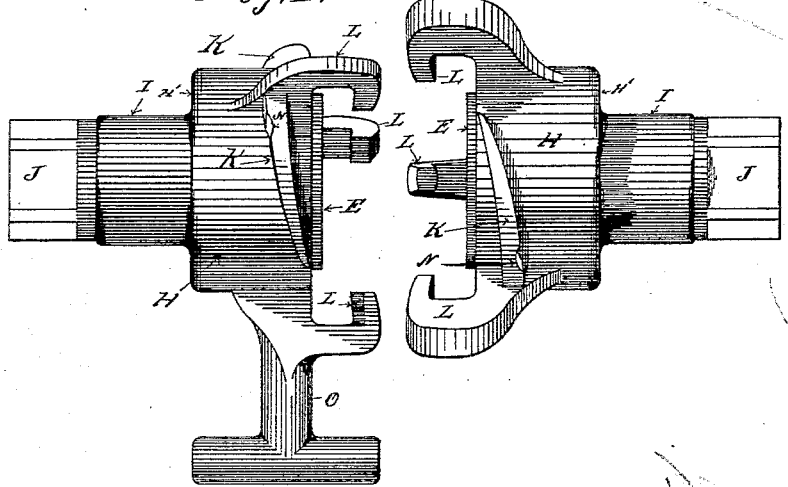
Figure 2:
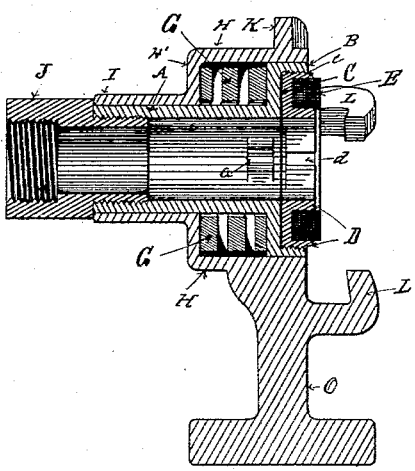
Figure 3:
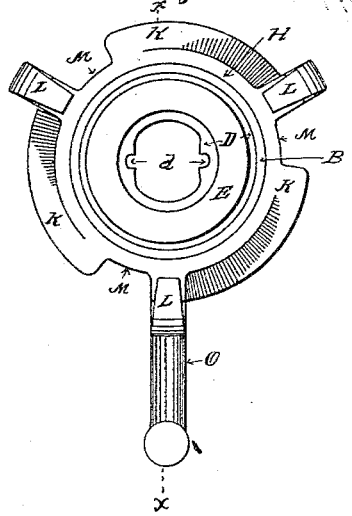

Figure 1 is a view of my coupling device uncoupled. Fig. 2 is a longitudinal section of one of the parts of my improved coupling. Fig. 3 is an end view of one of the parts of my device.

Like letters refer to like parts in all the figures.

My invention is designed and adapted for coupling any kind of pipes or hose, but is especially adapted for coupling steam-pipes between railway-cars, where a coupling is required to be so made that the part on any one pipe-section will fit and couple to a like part on any other pipe-section with which it may be brought into contact and make a steam and water tight joint, and at the same time be capable of being quickly and conveniently uncoupled or coupled. Another desirable feature in couplings for this purpose is that they be so constructed that the coupling is substantially rigid when coupled and so that it will resist any movement caused by the vibration of the cars, and also any inclination to sag from its own weight and that of the pipes coupled by it, as in either case the joint will open more or less and leak water and steam. To overcome these difficulties I have so constructed my coupling that the parts are braced in all directions when coupled, so as to form a joint substantially as rigid as the pipe itself.

Other features of my invention are set forth hereinafter in the specification and claims.

To accomplish these objects I make nipples A, adapted to be coupled to pipes or hose. On the outer ends of these nipples A, I construct collars B, and in the ends of these collars B, I turn out chambers C, which chambers C, I provide with internal screw-threads, c. Into these chambers C, I screw packing-shells D, which are screw-threaded on their peripheries to fit the threads c in the chambers C. These packing-shells D are chambered out on their outer sides to receive and retain packing-rings E, of rubber composition or other semi-elastic steam or fluid packing, F, of such density as may be required, the packing-shells D being constructed and secured to the nipples in this manner, so that in case of injury to the packing F they can at once be removed and new packing-shells D, with new packing F therein, quickly substituted therefor.

On the nipples A, back of the collars B, I place strong spiral springs G, which encircle the nipples A, (however, I can use rubber or other resilient substance in lieu of said spiral springs, if I so desire.) The coupling-heads H are chambered out so as to pass over and inclose the collars B and springs G, and back of the springs G the coupling-heads H are reduced in size to sleeves I, which fit over the nipples A, so that the coupling-heads H rotate and slide freely thereon, the heads H being constructed in this shape to form shoulders H' back of the springs G, so that the springs G are inclosed within the coupling-head H between these shoulders H' and the collars B and operate to force the heads H back upon the nipples A, and when the coupling-heads H H are coupled together the springs G, being compressed thereby, operate to take up any and all slack between the hooks L and the spiral cams K of the corresponding head and retain the hooks L in the notches N of the cams, regardless of the vibrations of the pipes coupled thereby. The springs G also operate to provide for any expansion of the metal of the coupling, after having been coupled, when cold, preventing the coupling from becoming immovably locked together thereby. The inner ends of the coupling heads H are also provided with extensions or sleeves I, which are bored out to fit the nipples A. These sleeves, together with the end of the chamber, fitting over the outside of the collars B, operate to prevent the coupling-heads H from wabbling on the nipples A, such wabbling tending to make the coupling leak when used to couple rigid steam-pipes between railway-cars, on account of the vibrations thereof.

To the back ends of the nipples A, I secure thimbles J, adapted to be coupled to pipes, or by the addition of short nipples (not shown) to hose. These thimbles J also operate as collars at the inner ends of the nipples A to retain the coupling-heads H in place.

Around the peripheries of the outer ends of the coupling-heads H, I make, preferably, three spiral cams or projections, K K K, and also three hooks, L L L, which project from one of the ends of each of said cam-surfaces outward beyond the end of the coupling-heads H in such shape that they will engage with the spiral cams K on a corresponding coupling-head, H, openings M being left at the outer end of each of said cams K for the passage of the ends of the hooks L. I can, however, use a greater or less number of cams K and hooks L in the construction of my coupling-heads, if desired; but from my experience I believe the number three, as shown, produce the best results, as the operation of three hooks upon three spiral cams placed equidistant around the peripheries of the heads operate to bring the faces of the packing-rings F squarely together with a like pressure on all sides, and at the same time the hooks and cams so located operate to brace the joint in all directions, so as to make the joint when coupled substantially rigid. In the cams K, I also provide notches or depressions N, so that when the hooks L travel up the inclines of the cams K they enter the notches or depressions N and are retained therein by the springs G, so that the joint cannot be uncoupled by the vibrations of the pipes or from other causes without considerable force applied thereto. I also provide the coupling-heads H with handles O, preferably one on each coupling-head H, by means whereof the operator can easily rotate the coupling-heads H upon the nipples A of the coupling.

In operation the coupling-heads H H are brought together end to end, as illustrated in Fig. 1, until the hooks L pass through the openings M at the outer ends of the cams K. Then by means of the handles O the operator rotates each head H upon the nipples A, which causes the hooks L to travel up the inclines of the spiral cams K, thereby drawing the faces of the packing-rings F firmly together and causing the collars B to travel back into the chambered portions of the coupling-heads H, thereby compressing the springs G together until the ends of the heads H are nearly together, when the hooks L, entering the depressions or notches N in the cams K, operate to substantially lock the coupling-heads together. It is opened by the operator grasping the handles O and giving them a quick jerk, which springs the hooks L out of the notches or depressions N, when the hooks travel back down the inclines of the cams K and release the parts of the coupling.

It is obvious that the heads being secured together at their equidistant points the joint is braced in all directions, preventing the faces of the packing F from being spread apart at any one point.

I am aware that it is not broadly new to employ rings with cam-surfaces and hooks adapted to engage such cam-surfaces. Therefore I do not claim the same, broadly, as my invention; but What I do claim as new, and desire to secure by Letters Patent of the United States, is—

1. The combination, in a pipe or hose coupling, of a nipple adapted to be secured to a pipe or hose, provided with a collar on the outer end thereof, and a spring around said nipple back of said collar, with a coupling-head inclosing said spring and collar and rotating on said nipple, having spiral cams on the periphery thereof, and hooks adapted to engage with like spiral cams on a corresponding coupling-head, substantially as and for the purpose set forth.

2. The combination, in a pipe or hose coupling, of a nipple adapted to be secured to a pipe or hose, having a collar on the outer end thereof and elastic packing in the outer end of said collar, with a spiral spring encircling said nipple back of the collar, and a coupling-head inclosing said spring and collar and rotating on said nipple, having three spiral cams on the periphery thereof, and three hooks equidistant from each other adapted to engage with like cams on a duplicate coupling-head, substantially as and for the purpose set forth.

3. The combination, in a pipe or hose coupling, of the nipple A, having the collar B on the outer end thereof, and the removable packing-shell D in the end of said collar, with the spiral spring G, and the rotating coupling-head H, inclosing said spring and collar and having the cams K K K and the hooks L L L thereon, substantially as and for the purpose set forth.

4. The combination, in the rotary coupling-head of a pipe or hose coupling, of the chamber adapted to inclose the spring G and collar B, and the sleeve I on the inner end thereof, with the spiral cams K and the hooks L, substantially as and for the purpose set forth.

5. The combination, in a pipe or hose coupling, of two like rotating coupling-heads, H H, each having sleeves I thereon, the spiral cams K, having notches N therein, and the hooks L, with the spiral springs G, inclosed within said coupling-heads and operating thereon to retain the hooks L of each of said coupling-heads in the notches N in the cams on the other and corresponding head when the two heads are coupled together, substantially as and for the purpose set forth.

In testimony whereof I affix my signature in presence of two witnesses.

JOHN C. STURGEON.

Witnesses:
EDWIN WALKER,
W. W. SIMPSON.